Patented Mar. 12, 1946

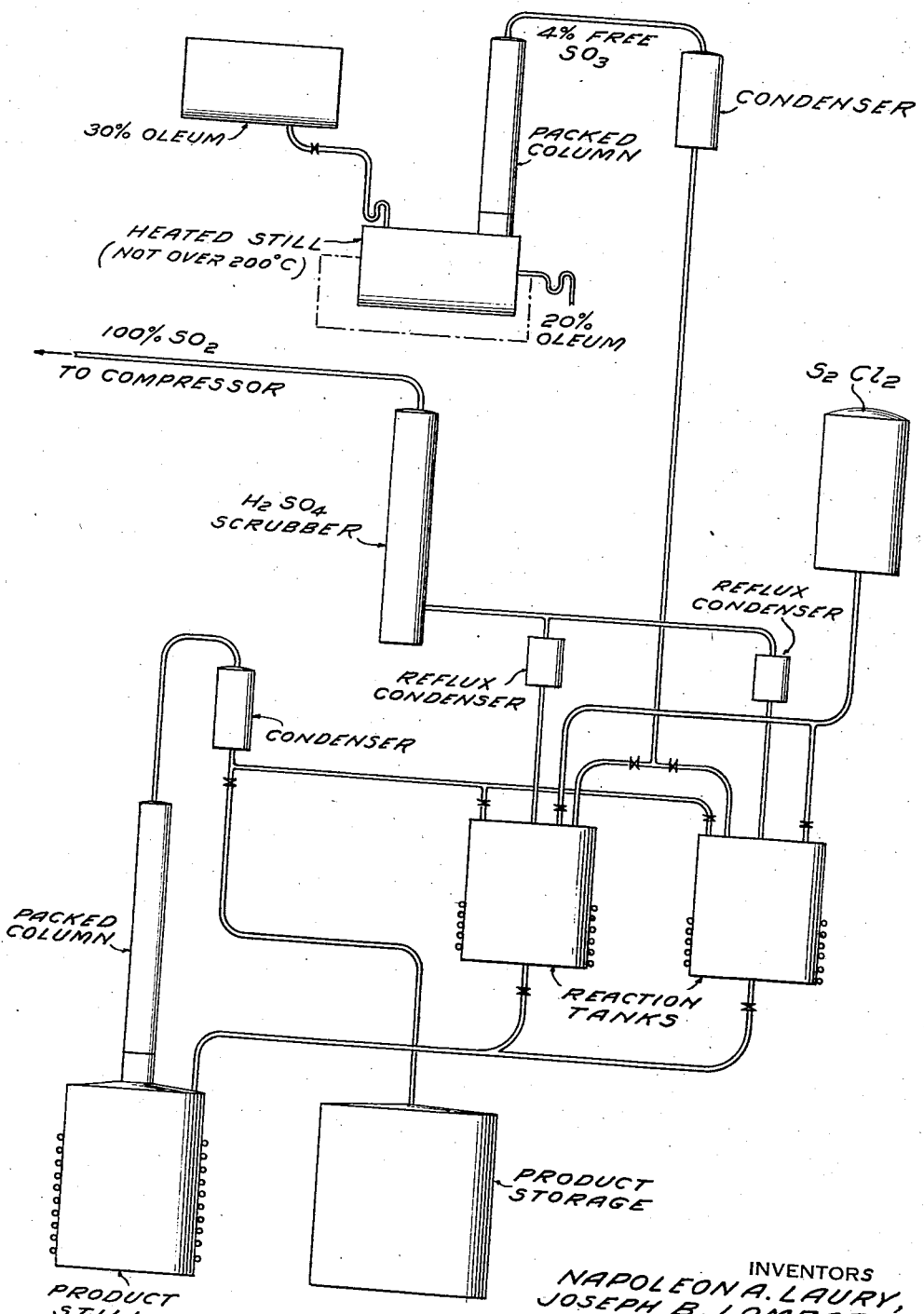

2,396,581

UNITED STATES PATENT OFFICE 2,396,581

PROCESS FOR MAKING PYROSULPHURYL CHLORIDE

Napoleon Arthur Laury, Bound Brook, and Joseph Boniface Lombardo, Somerville, N. J., assignors to American Cyanamid Company, New York, N. Y., a corporation of Maine Application February 2, 1945, Serial No. 575,820

8 Claims. (Cl. 23—203)

This invention relates to an improved process of preparing pyrosulphuryl chloride.

Pyrosulphuryl chloride has been known for a long time, but it has remained more or less of a laboratory reagent because its costs have been too high to permit industrial use. Many processes for its preparation have been described, but none of them was cheap enough for large scale manufacture. One of these processes involved the reaction of fuming sulphuric acid with sulphur monochloride. The reaction, while practicable, is expensive, as it involves an enormous excess of fuming sulphuric acid and one of the products of the reaction, sulphuric acid, combines with the pyrosulphuryl chloride and has to be freed by careful fractional distillation.

Various authors have suggested the reaction of sulphuric acid anhydride itself with sulphur monochloride. As a matter of fact, the reaction of gaseous sulphur trioxide on sulphur monochloride was the first reaction by which pyrosulphuryl chloride was synthesized; but the yields were very bad and the product obtained was impure, as indicated by the low boiling point. The whole procedure was so unsatisfactory and cumbersome that the inventor, Rose, abandoned it and developed the expensive process described above, using fuming sulphuric acid instead of sulphur trioxide. He remarks (Pogg. Ann. 46, p. 177): "The preparation of pyrosulphuryl chloride as described in my former paper is extremely cumbersome and time-consuming. An extremely high amount of sulphur trioxide is needed to convert a given amount of sulphur monochloride into pyrosulphuryl chloride."

As later shown by other authors, the Rose reaction of gaseous sulphur trioxide on sulphur monochloride was improved by heating a mixture of sulphuric acid anhydride and sulphur monochloride. But the yield of about 60% obtainable by this process was not high enough for its industrial use.

According to the present invention, we have found that pyrosulphuryl chloride is obtained in a yield of 90% or more, if the relatively unstable liquid sulphur trioxide is reacted with sulphur monochloride. The best procedure is to introduce sulphur monochloride into liquid sulphur trioxide, thus avoiding an excess of sulphur monochloride at every stage of the reaction without using a higher excess of sulphur trioxide than —15%.

The reaction between the $SO_3$ and the sulphur monochloride is not particularly critical. If it is to be effected under atmospheric pressure cooling is needed at the beginning, as serious losses of reactants may take place if the temperature rises above 35° C. Toward the end of the reaction higher temperatures are permissible. It is also possible to carry out the reaction under pressure. This involves more expensive equipment. Reaction is more rapid and under certain conditions the additional equipment cost is justified. Normally an intermittent or semi-continuous process is desirable, and for most plants the use of pressure vessels is not economically justified. In either case, however, high yields of 90% or more result from the reaction.

It is an advantage of the process of the present invention that no serious corrosion problem is presented. On the contrary ordinary steel equipment may be used and no expensive corrosion resistant material is necessary.

The invention will be described in greater detail in the following examples in conjunction with the drawing, which shows a typical flow sheet for a semi-continuous process. The parts are by weight unless otherwise specified.

Example 1

A heated steel still is continuously fed with 30% oleum at such a rate that the temperature of the liquid in the still is not over 200° C. and the overflow from the still contains 4% free $SO_3$. The rising vapor of $SO_3$ contains some $H_2SO_4$, and it is passed up through a packed column in which there is a small reflux of $SO_3$ which frees the vapor of any $H_2SO_4$. The liquid $SO_3$ is collected in a steel tank until it contains 400 lbs. There is then fed $S_2Cl_2$ into the tank at such a rate that the temperature does not rise above 35° C. Cooling may be applied to the reaction tank as further control. This procedure accomplishes two purposes: (1) The removal of sulphuric acid from the sulphur trioxide ahead of the reactor to keep it out of the products. (2) The use of the liquid $SO_3$ for the reaction before it has had time to polymerize to a solid polymer. The total amount of sulphur monochloride used is 132 lbs., a little less than one mol. for five mols. of sulphur trioxide. At the mentioned temperature of 35° C. the reaction gives off $SO_2$ at such a rate that it can conveniently be scrubbed with 98% $H_2SO_4$ in a tower to remove small amounts of $SO_3$ contained in it and then the pure $SO_2$ is compressed and condensed. Toward the end of the reaction some heat is applied by means of a steam coil to drive out the remaining $SO_2$. The temperature is permitted to rise but is kept at a point where the loss of $SO_3$ is negligible.

the temperature exceed 60° C. Water may be circulated in this steam coil to restrain the reaction if necessary early in the charge. The charge is now transferred to a steel still. From this still the first runnings contain some $SO_3$; so this condensate is run to a reaction tank to be used in a succeeding charge. The main fraction distilled is pure. A packed column is used on this still but it is merely a safeguard in case there may be some unreacted $S_2Cl_2$. Normally the quantities of reactants can be so regulated that no residue is left in the still at all.

The reaction is preferably made semi-continuous, as is shown on the flow sheet, by using two reaction tanks, in one of which the reaction is proceeding by feeding sulphur monochloride through the valved pipe shown on the flow sheet, while the other vessel is being heated to complete the reaction and drive off $SO_2$, followed by withdrawing the charge and introducing it to the product still which removes $SO_3$ and distills over the pure pyrosulphuryl chloride. As soon as the charge has been removed a fresh charge of $SO_3$ is run in and then sulphur monochloride is introduced with cooling while the charge in the other vessel is heated to drive off $SO_2$, and the charge then led to the product still. The product still operates continuously or semi-continuously and high output is obtained with a minimum of supervision, as the temperatures and reaction times are not critical.

Example 2

Liquid $SO_3$, substantially free of $H_2SO_4$ is produced by distillation as described in Example 1. A charge of it is run into a closed steel pressure tank. Then a quantity of sulphur chloride is charged into the tank by pumping or other suitable means. The quantity used should be equivalent to a ratio of one mol of $S_2Cl_2$ to five mols of $SO_3$ plus an excess of 5 to 15% of the latter. Using temperature and pressure instruments as guides, the charge is heated, preferably with a steam coil, so that the readings rise gradually to 75° C. and 165 pounds over a period of one hour or longer, according to the size of the charge.

The tank now contains pyrosulphuryl chloride, $SO_2$ and some unreacted $SO_3$, the latter two as gases. These gases are released to a scrubbing tower in which the $SO_3$ is condensed to a liquid by cooling and then transferred to storage still under pressure. The pyrosulphuryl chloride is pure enough as it is for most purposes but a distillation to free it of some dissolved gas and traces of unreacted $S_2Cl_2$ is necessary to reach high purity. The yields both of pyrosulphuryl chloride and liquid $SO_2$ approximate 90%.

The use of a pressure vessel has been described in conjunction with the batch process. It is, of course, possible to incorporate pressure vessels in the semi-continuous flow sheet described in connection with Example 1, and where large production is desired this might be advantageous, since the $SO_2$ set free in the reaction remains in the pressure vessel until the reaction has been completed, the $SO_2$ scrubber is operated intermittently.

The term "sulphur trioxide" has been used in its general sense as covering oxides of sulphur having 3 atoms of oxygen for every atom of sulphur, and which may be considered as anhydrides of sulphuric acid. The term is not to be restricted to the monomer $SO_3$ only but includes polymers such as $S_2O_6$ or $S_3O_9$ which may be present in the liquid. Of course, polymers are unsuitable if they are present in such amount that the product is no longer liquid at the reaction temperature. If the proportion of polymers is so high that the mass solidifies the process becomes impractical. In the claims, the term "sulphur trioxide" will be used in the above general sense.

We claim:

1. A method of preparing pyrosulphuryl chloride which comprises reacting liquid sulphur trioxide, substantially free from sulphuric acid, with sulphur monochloride until the reaction is complete, and removing sulphur dioxide formed.

2. A method of preparing pyrosulphuryl chloride which comprises reacting liquid sulphur trioxide, substantially free from sulphuric acid, with sulphur monochloride until the reaction is complete, removing sulphur dioxide formed and purifying the pyrosulphuryl chloride by distillation and condensation at a temperature at which pyrosulphuryl chloride is condensed and sulphur trioxide remains in the gaseous form.

3. A method according to claim 1, in which the reaction proceeds by introducing sulphur monochloride into liquid sulphur trioxide.

4. A method according to claim 2, in which the reaction proceeds by introducing sulphur monochloride into liquid sulphur trioxide.

5. A method according to claim 1 in which the reaction is effected in a closed vessel under pressure.

6. A method according to claim 2 in which the reaction is effected in a closed vessel under pressure.

7. A method according to claim 1 in which sulphur monochloride is introduced into liquid sulphur trioxide at a temperature not exceeding 35° C. until all of the sulphur monochloride has been introduced and the reaction has slowed down, and completing the reaction at a higher temperature not in excess of 60° C.

8. A method according to claim 2 in which sulphur monochloride is introduced into liquid sulphur trioxide at a temperature not exceeding 35° C. until all of the sulphur monochloride has been introduced and the reaction has slowed down, and completing the reaction at a higher temperature not in excess of 60° C.

NAPOLEON ARTHUR LAURY.
JOSEPH BONIFACE LOMBARDO.